(12) United States Patent
    Gebotys

(10) Patent No.: US 8,325,928 B2
(45) Date of Patent: *Dec. 4, 2012

(54) SECURITY COUNTERMEASURE FOR POWER ANALYSIS ATTACKS

(75) Inventor: Catherine Helen Gebotys, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/948,915

(22) Filed: Nov. 18, 2010

(65) Prior Publication Data

US 2011/0064225 A1 Mar. 17, 2011

Related U.S. Application Data

(62) Division of application No. 10/825,291, filed on Apr. 16, 2004, now Pat. No. 7,899,190.

(51) Int. Cl.
*H04L 9/08* (2006.01)

(52) U.S. Cl. ............ 380/286; 380/28; 380/30; 380/205; 380/252; 380/277; 380/278; 380/279; 713/171; 713/172

(58) Field of Classification Search ............ 380/28, 380/30, 205, 252, 277, 286, 278–279; 713/171–172
See application file for complete search history.

(56) References Cited

U.S. PATENT DOCUMENTS

| | | | |
|---|---|---|---|
| 4,706,266 A | 11/1987 | Qayyum | |
| 5,446,651 A * | 8/1995 | Moyse et al. | 708/630 |
| 5,479,626 A | 12/1995 | Bindloss et al. | |
| 5,623,548 A | 4/1997 | Akiyama et al. | |
| 6,052,469 A | 4/2000 | Johnson et al. | |
| 6,278,783 B1 * | 8/2001 | Kocher et al. | 380/277 |
| 6,295,606 B1 | 9/2001 | Messerges et al. | |
| 6,419,159 B1 | 7/2002 | Odinak | |
| 6,658,569 B1 | 12/2003 | Patarin et al. | |
| 7,386,130 B2 | 6/2008 | Ito et al. | |
| 7,403,620 B2 | 7/2008 | Liardet et al. | |
| 2001/0025362 A1 | 9/2001 | Shimada et al. | |
| 2001/0053220 A1 | 12/2001 | Kocher et al. | |
| 2003/0044003 A1 | 3/2003 | Chari et al. | |

(Continued)

FOREIGN PATENT DOCUMENTS

EP 0981223 2/2000

(Continued)

OTHER PUBLICATIONS

Chari et al., "Towards Sound Approaches to Counteract Power-Analysis Attacks", CRYPTO'99, Lecture Notes in Computer Science, 1666, pp. 398-412, 1999, Springer-Verlag.

(Continued)

*Primary Examiner* — Thanhnga B Truong
(74) *Attorney, Agent, or Firm* — Etiennede Villiers; Dimock Stranton LLP

(57) ABSTRACT

A countermeasure for differential power analysis attacks on computing devices. The countermeasure includes the definition of a set of split mask values. The split mask values are applied to a key value used in conjunction with a masked table defined with reference to a table mask value. The set of n split mask values are defined by randomly generating n−1 split mask values and defining an nth split mask value by exclusive or'ing the table mask value with the n−1 randomly generated split mask values.

30 Claims, 5 Drawing Sheets

U.S. PATENT DOCUMENTS

| | | | |
|---|---|---|---|
| 2003/0048903 | A1 | 3/2003 | Ito et al. |
| 2004/0028224 | A1 | 2/2004 | Liardet et al. |
| 2004/0071288 | A1 | 4/2004 | Romain et al. |
| 2004/0071291 | A1 | 4/2004 | Romain et al. |
| 2005/0008348 | A1 | 1/2005 | Collar et al. |
| 2005/0232430 | A1 | 10/2005 | Gebotys |

FOREIGN PATENT DOCUMENTS

| | | |
|---|---|---|
| EP | 1267514 | 12/2002 |
| EP | 1601132 | 11/2005 |
| EP | 1833190 | 9/2007 |
| WO | 2006021641 | 3/2006 |

OTHER PUBLICATIONS

Gladman, Brian, "A Specification for Rijndael, the AES Algorithm", v3.11, Sep. 12, 2003, pp. 1-37 (http://fp.gladman.plus.com/cryptography_technology/rijndael/aes.spec.311.pdf).

Itoh, K. et al., "DPA Countermeasure Based on the "Masking Method"", Information Security and Cryptology—ICISC 2001, v 2288, 2002, pp. 440-456, XP002297044.

Kocher, P., "Differential Power Analysis", CRYPTO'99, Lecture Notes in Computer Science, 1666, pp. 388-397, 1999, Springer-Verlag.

Messerges, T. S., "Securing the AES Finalists Against Power Analysis Attacks" Fast Software Encryption. International Workshop, vol. 1978, Apr. 2000, pp. 150-164, XP001040960.

Gebotys et al. "EM Analysis of Rijndael and ECC on a Wireless Java-Based PDA", Sep. 19, 2005, Lecture Notes in Computer Science, vol. 365912005, Springer Berlin, Heidelberg, pp. 263-264.

Gebotys, C., "Third Order Differential Analysis and a Split Mask Countermeasure for Low Energy Embedded Processors", pp. 1 to 27, published in 2005, technical report No. CACR 2004-11, University of Waterloo.

Gebotys, C., "Differential Analysis of a Low Energy Table-Based Countermeasure for Secure Embedded Systems", pp. 1 to 28, published in 2004, technical report No. CACR 2005-24, University of Waterloo.

Golic et al.; "Muttiplimtive Masking and Power Analysis of AES"; Lecture Notes in Computer Science; vol. 2523, pp. 198-212 (2003).

Akkar, M., Giraud, C., "An Implementation of DES and AES, Secure against Some Attacks", CHES 2001, LNCS 2162, pp. 309-318, 2001, Springer-Verlag Berlin Heidelberg 2002.

* cited by examiner

SECURITY COUNTERMEASURE FOR POWER ANALYSIS ATTACKS

CROSS-REFERENCE TO RELATED APPLICATIONS

This application is a divisional of application Ser. No. 10/825,291, filed Apr. 16, 2004 now U.S. Pat. No. 7,899,190.

FIELD OF THE INVENTION

This invention relates generally to computing systems and, more particularly, to computing systems implementing security countermeasures for power analysis attacks.

BACKGROUND OF THE INVENTION

Computing systems often require operations to be carried out in a secure manner. For embedded computing devices and for pervasive systems, security of operation is often crucial. To ensure operations and communications are secure, such systems employ cryptographic methods.

The implementation of such a cryptographic method must itself be secure. However, cryptographic methods are subject to attacks. One type of non-invasive attack on computing devices implementing cryptographic methods is known as a power analysis attack. A power analysis attack involves the monitoring of the power consumption of one or more components of a device while the device executes a cryptographic method.

The data derived from monitoring power consumption of the device, combined with knowledge of the operations being carried out by the device, are used to derive the secret information that is part of the cryptographic method.

One type of power analysis attack is known as a Differential Power Analysis ("DPA") (see, for example, "Differential Power Analysis" P. Kocher, CRYPTO'99, Lecture Notes in Computer Science, 1666, pp. 388-397, 1999, Springer-Verlag). This approach involves generating a large number of inputs by varying different bits in values to be encoded using the cryptographic method implemented in a device. The DPA attack monitors power consumption at different points in the computing device for each of these varying values and, by statistical analysis the differential data, is able to determine a likely key value for the cryptographic method (the secret information).

It is known to use hardware techniques to implement countermeasures for such power analysis attacks. Such an approach may use smoothing or modification of the power consumption of the device to resist a power analysis attack. For example, see U.S. Pat. No. 6,419,159 to Odinak.

Similarly, countermeasures implemented in software have been developed. U.S. Pat. No. 6,295,606 to Messerges and "Towards Sound Approaches To Counteract Power-Analysis Attacks" (S. Chari, C. S. Jutla, J. R. Rao, P. Rohatgi, CRYPTO'99, Lecture Notes in Computer Science, 1666, pp. 398-412, 1999, Springer-Verlag), describe approaches that implement countermeasures to resist power analysis attacks. However, such software approaches involve overhead costs in performance.

U.S. Pat. No. 6,295,606 (Messerges et al., Sep. 25, 2001) discloses a method for resisting a power analysis attack for a cryptographic method. The cryptographic method includes a key value that is combined with a plaintext value by a bitwise Boolean exclusive or operation. The result is used as input for a function that provides a cipher text output. The cryptographic function is usually implemented as one or more table look-ups. The Messerges method involves a masking step carried out by applying a bitwise Boolean exclusive or operation to the key using a random value (the mask). In the Messerges method the masked key is then exclusive or'd with a plaintext and the result is used as input for a function that has, itself, been modified to provide a masked output that can be unmasked to provide the correct result data. To apply a DPA attack against a device that is using the Messerges method requires a second order DPA: power samples for the random value (mask) and the output of the bitwise Boolean XOR of the masked key and the plaintext are required. Complex mathematical analysis is then required to enable the key value to be determined.

In the approach of Messerges, by masking each key value with a different random mask, the cryptographic function is also required to be modified. This typically results in the regeneration of a large table for each application of the cryptographic function. A large overhead price is borne by the system implementing this approach to avoid or limit DPA attacks.

Another known approach is set out in Chari (see above) and involves splitting the key value. In this approach the key value is to be divided into a number (k) of fragments and the fragments are combined with random bits. The approach requires a $k^{th}$ order DPA to attempt to determine the original key value used. However, the Chari approach requires the plaintext to be exclusive or'd with each of the split key values. The end result is that the processor executing the Chari method will require more power as the repeated running of the cryptographic function will necessitate the dissipation of more energy. In devices such as personal digital assistants, energy consumption is a crucial factor and therefore there are limitations to applying this approach for many types of products.

It is therefore desirable to be able implement a countermeasure that will resist a DPA attack and will not require repeated potentially power-consuming operations.

SUMMARY OF THE INVENTION

According to an aspect of the invention there is provided a method and system for improved countermeasures for power analysis security attacks.

According to another aspect of the invention there is provided a computing device-implemented method for carrying out encryption using a key value for encrypting a plaintext value to define a cipher text, the encryption being defined using an encryption function, the method including the steps of: defining a masked encryption function by masking the encryption function using an encryption function mask value; defining a set of more than one split mask values, at least one of the set of split mask values being defined with reference to the encryption function mask value; generating a final mask value by masking the key value using masking steps that comprise masking by applying the set of split mask values; determining an input value by masking the plaintext value using masking steps that comprise masking by applying the fixed final mask value, and applying the input value to the encryption function to provide a cipher text output.

According to another aspect of the invention there is provided the above method in which the step of generating the final mask value further includes the step of masking the key value using a key mask value prior to masking with the set of split mask values, and which further includes the step of using the key mask value as a mask, as part of the step of defining one of the values in the set of split mask values with reference to the encryption function mask value.

According to another aspect of the invention there is provided the above method in which the step of defining one of the set of split mask values with reference to the encryption function mask value further includes the steps of masking the split mask value with the other values in the set of split mask values.

According to another aspect of the invention there is provided the above method in which the step of defining a set of split mask values m1 ... mn includes the steps of: defining the encryption function mask value to comprise a set of random values min1 to minn; defining the set of split mask values to be the random values m1 to mn−1; and defining a masking value mn in the set of split mask values to be (key mask value)^ min1^ ... ^minn^m1^ ... ^mn−1.

According to another aspect of the invention there is provided the above method further including the steps of applying a random mask to an even number of the set of split mask values prior to the step of masking the key value with the set of split mask values.

According to another aspect of the invention there is provided a computing device-implemented method for use in a cryptographic process, the cryptographic process using a key value to define input to a cryptographic function, the method including the steps of: masking the cryptographic function using a function mask value; defining a set of more than one split mask values, at least one of the set of split mask values being defined with reference to the function mask value; masking the key value using steps that comprise masking by applying the set of split mask values to obtain a masked input key value; and using the masked input key value to define the input to the masked cryptographic function.

According to another aspect of the invention there is provided the above method, further including the step of randomizing the split mask values.

According to another aspect of the invention there is provided a computing device-implemented method for use with an AES key generation process for defining masked round keys for use in AES encryption, the method including the steps of: defining a masked table for use the AES key generation process using table mask M; defining a set of four split mask values, one of the set of split mask values being defined with relation to table mask M; masking a set of four key values using the set of four split mask values and applying the resulting values to the AES key generation process using the masked table and a set of intermediate mask values whereby the set of AES round keys defined using table look-up are defined by applying an appropriate intermediate mask value to the input value for the masked table; and masking the round keys produced by the AES key generation process by applying an appropriate intermediate mask value to the round keys that are not directly defined using table look-up.

According to another aspect of the invention there is provided the above method in which the four key values are each masked with one of a set of four key mask values and in which the split mask value in the set of split key mask values that is defined with relation to table mask M is further masked with each of the four key mask values.

According to another aspect of the invention there is provided a computing device-implemented method for carrying out AES encryption using the round keys as defined above, the output of the AES encryption being unmasked using the key mask values and the split mask values.

According to another aspect of the invention there is provided the above method in which the unmasking is carried out in more than one step such that the key mask values and the split mask values are not combined so as to produce a single unmasking value.

According to another aspect of the invention there is provided a computing device program product for carrying out encryption using a key value for encrypting a plaintext value to define a cipher text, the encryption being defined using an encryption function, the computing device program product including a computer usable medium having computer readable program code means embodied in the medium, and including program code means for defining a masked encryption function by masking the encryption function using an encryption function mask value; program code means for defining a set of more than one split mask values, at least one of the set of split mask values being defined with reference to the encryption function mask value; program code means for generating a final mask value by masking the key value using masking steps that comprise masking by applying the set of split mask values; program code means for determining an input value by masking the plaintext value using masking steps that comprise masking by applying the fixed final mask value; and program code means for applying the input value to the encryption function to provide a cipher text output.

According to another aspect of the invention there is provided the above computing device program product in which
the program code means for generating the final mask value further includes program code means for masking the key value using a key mask value prior to masking with the set of split mask values, and which
further includes program code means for using the key mask value as a mask, as part of defining one of the values in the set of split mask values with reference to the encryption function mask value.

According to another aspect of the invention there is provided a system for carrying out encryption using a key value for encrypting a plaintext value to define a cipher text, the encryption being defined using an encryption function, the system including: means for defining a masked encryption function by masking the encryption function using an encryption function mask value; means for defining a set of more than one split mask values, at least one of the set of split mask values being defined with reference to the encryption function mask value; means for generating a final mask value by masking the key value using masking steps that comprise masking by applying the set of split mask values; means for determining an input value by masking the plaintext value using masking steps that comprise masking by applying the fixed final mask value, and means for applying the input value to the encryption function to provide a cipher text output.

According to another aspect of the invention there is provided the above system in which the means for generating the final mask value further includes means for masking the key value using a key mask value prior to masking with the set of split mask values, and which system further includes means for using the key mask value as a mask, as part of defining one of the values in the set of split mask values with reference to the encryption function mask value.

According to another aspect of the invention there is provided the above system in which the means for defining one of the set of split mask values with reference to the encryption function mask value further includes means for masking the split mask value with the other values in the set of split mask values.

According to another aspect of the invention there is provided the above system in which the means for defining a set of split mask values m1 ... mn includes means for: defining the encryption function mask value to comprise a set of random values min1 to minn; defining the set of split mask values to be the random values m1 to mn−1; and defining a masking value mn in the set of split mask values to be (key mask value)^ min1^ ... ^minn^m1^ ... ^mn−1.

According to another aspect of the invention there is provided a system for use in a cryptographic process, the cryptographic process using a key value to define input to a cryptographic function, the system including: means for masking the cryptographic function using a function mask value; means for defining a set of more than one split mask values, at least one of the set of split mask values being defined with reference to the function mask value; means for masking the key value using steps that comprise masking by applying the set of split mask values to obtain a masked input key value; and means for using the masked input key value to define the input to the masked cryptographic function.

According to another aspect of the invention there is provided the above system, further including means for randomizing the split mask values.

Advantages of the invention include software-based countermeasures for power analysis security attacks requiring limited overhead costs in energy, performance and code size. Such limited overhead permits the use of this countermeasure approach with devices such as wireless hand-held communication devices where security is required for the operations carried out by the devices. An aspect of the invention supports high performance cryptographic implementation by supporting large table look-ups as part of the cryptographic process.

BRIEF DESCRIPTION OF THE DRAWINGS

In drawings which illustrate by way of example only a preferred embodiment of the invention.

DETAILED DESCRIPTION OF THE INVENTION

Figure 1:
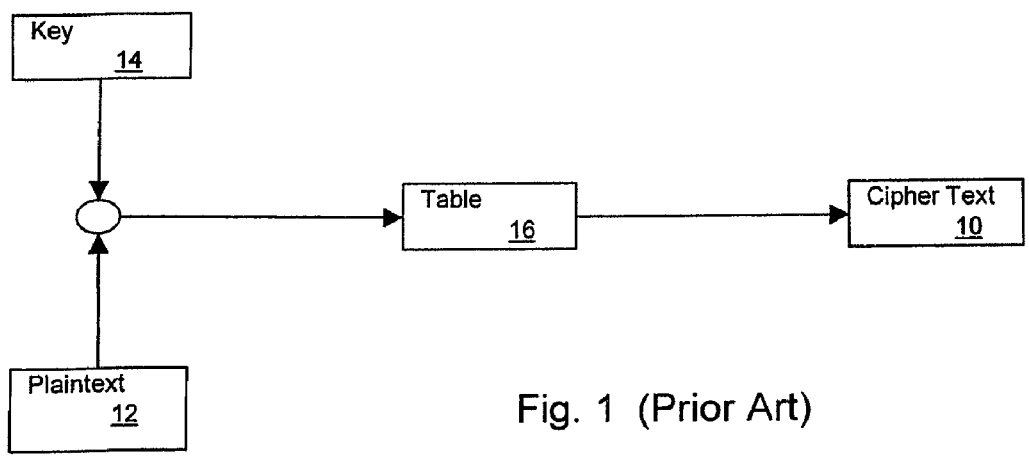
FIG. 1 is a block diagram showing prior art generation of a cipher text.

FIG. 1 is a block diagram that shows prior art generation of cipher text 10 from plaintext 12, using key 14. Table 16, used for look-up, is a typical implementation of a cryptographic function. Plaintext 12 is input, along with key 14, for a bitwise exclusive or (represented in the figure as an oval). The output of the exclusive or is used for a table look up that gives cipher text 10. As is known to those skilled in the art, this encryption of plaintext 12 is subject to power analysis attacks, such as Differential Power Analysis ("DPA") attacks, to determine the value of the secret key and so compromise the security of the encryption carried out by the process described.

In the preferred embodiment, multiple masks (two or more) are used in the execution of the cryptographic process. In general, where the cryptographic process includes a table lookup, the multiple masks are exclusive or'd together to form a fixed final mask for each table input. In the preferred embodiment, the multiple masks may be randomized at each invocation of the cryptographic process. In the preferred embodiment, however, the final fixed mask for the table input is not changed. The table itself may therefore remain unchanged.

As will be appreciated by those skilled in the art, the preferred embodiment is described with reference to an encryption function that includes a table look-up. The preferred embodiment may also be implemented, however, with respect to other cryptographic processes in which encryption or decryption functions are implemented in a manner that does not involve a table look-up. The masking steps defined with respect to the table in the preferred embodiment will may similarly be carried out on encryption or decryption functions that are implemented in ways other than by a table look-up. The preferred embodiment is described with reference to encryption steps. However, it will be appreciated that the preferred embodiment may be implemented with respect to decryption processes, also.

Similarly, the masking referred to in the description of the preferred embodiment is carried out by the use of a bit-wise exclusive or operation (XOR) with respect to different values expressed in a binary format. However, other masking operations may be used. For example arithmetic masking (involving the use of addition and/or subtraction in place of the exclusive or operation) may also be used.

Further, the preferred embodiment may be implemented as a computer program product that includes code to carry out the steps in the process described. The preferred embodiment may be implemented as a computer system (which includes a subsystem or system defined to work in conjunction with other systems) for encryption that includes elements that execute the functions as described. The computer system of the preferred embodiment may be defined by, and the computer program product may be embodied in storage media such as magnetic, electronic or optical storage media.

Figure 2:
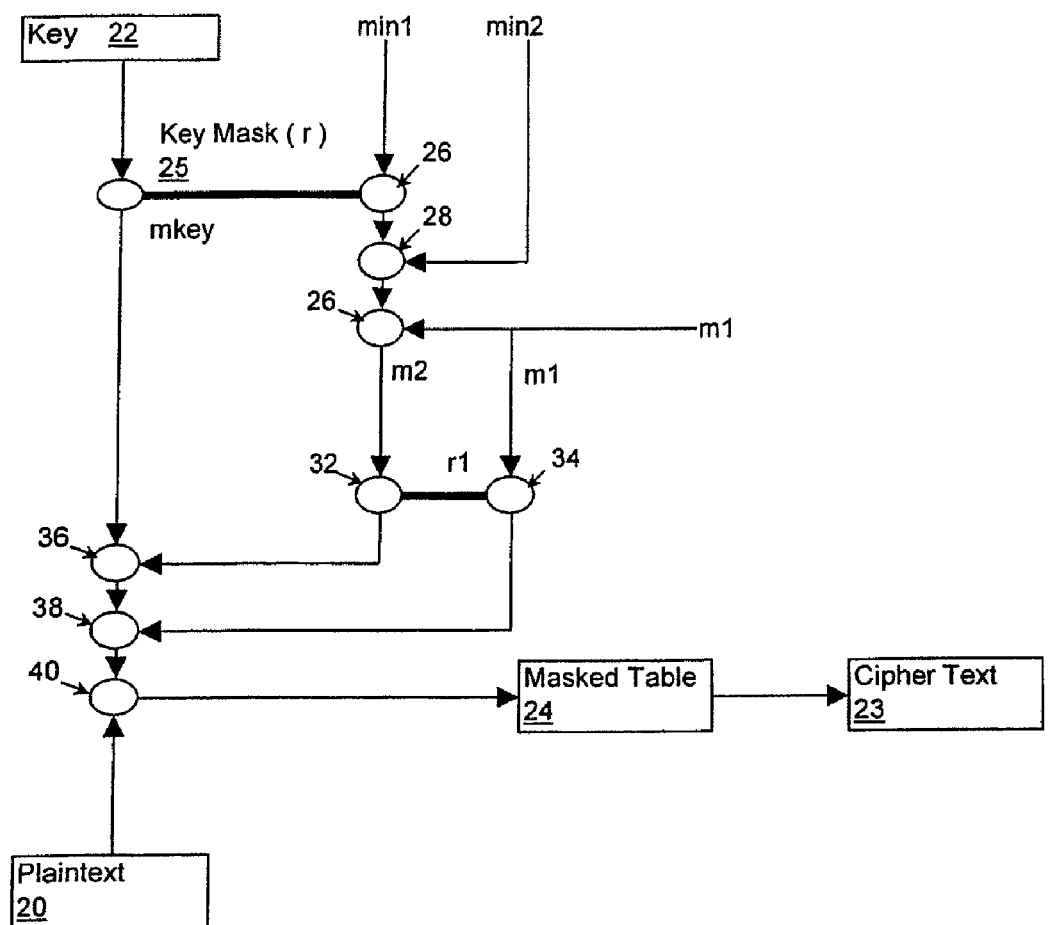
FIG. 2 is a block diagram showing a two-part split mask and its use in generating cipher text according to the preferred embodiment.

FIG. 2 is a block diagram that illustrates an example of encryption using the approach of the preferred embodiment. FIG. 2 shows plaintext 20, key 22, and masked table 24. As is understood by those skilled in the art, where there is a masking process carried out to alter a key value, there is a corresponding alteration in the table values that define the cryptographic function. In the example of the preferred embodiment shown in FIG. 2, masked table 24 is generated from an original, unmasked table using a two-part mask comprising $m_{in}1$ and $m_{in}2$. The values in masked table 24 ("mtable") are defined by:

$$\text{table}(i) = m\text{table}(i \,\hat{}\, m_{in}1 \,\hat{}\, m_{in}2)$$

The two-part mask in the preferred embodiment is randomly generated. Alternatively, this table mask value (like other table mask values useable in the preferred embodiment) may be pseudo-random or otherwise selected in a manner that is not readily ascertainable using DPA attacks.

The secret or master key 22 is immediately masked after it is received or derived. In the example of FIG. 2, key 22 is masked (exclusive or'd) with key mask 25 (designated value "r") and is stored. Key mask 25 is randomly generated and is a fixed value in the example of the preferred embodiment in that it is unchanged for different plaintext values.

As is referred to above, masked table 24 is defined using two randomly generated constants $m_{in}1$ and $m_{in}2$. In the example of FIG. 2, $m_{in}2$ and $m_{in}2$ are used to generate split masks that are applied to key 22 (as initially masked by key mask 25). The process of the preferred embodiment involves a further randomly generated value, m1. This value is used as part to the process to define a second value, m2, as is described below.

As can be seen by exclusive ors 26, 28, 30, shown in FIG. 2, key mask 25 is exclusive or'd with $m_{in}1$ and $m_{in}2$, and the result is exclusive or'd with m1. The result is defined to be the value m2, one of the split mask values to be used to be applied to the key value 22 (as masked). In mathematical notation:

$$m2 = r \hat{} m_{in}1 \hat{} m_{in}2 \hat{} m1$$

As may be seen, the initial pair of masks, m1, m2 are generated such that the exclusive or of those values with r (key mask 25) is equal to the fixed mask ($m_{in}1 \hat{} m_{in}2$), to be used at the input of masked table 24 in the encryption process. Thus for each new key 22, the key masking and generating of initial pair of masks (m1 and m2) need be performed only once.

In the preferred embodiment example of FIG. 2, plaintext 20 is combined with the masked value for key 22, using a random value r1 and the split masks m1, m2 in the following way. Random value r1 is generated for each new plaintext value. The value r1 is exclusive or'd with both m1 and m2, as shown in exclusive ors 32, 34 in FIG. 2. The resultant values are then exclusive or'd with the masked value of key 22 ("mkey"). In FIG. 2, this is shown in exclusive ors 36, 38. Finally, the masked key resulting from these operations is exclusive or'd with plaintext 20 to form the input for masked table 24, at exclusive or 40.

The result of the steps described above is that key 22 is exclusive or'd with r, (r1^m2) and (r1^m1). Because m2 is, itself, defined to be $r \hat{} m_{in}1 \hat{} m_{in}2 \hat{} m1$, the result of the different exclusive or operations is that key 22 is exclusive or'd with ($m_{in}1 \hat{} m_{in}2$). Masked table 24 is defined by applying ($m_{in}1 \hat{} m_{in}2$) to the original cryptographic table, and therefore the result is that plaintext 20 is combined with a masked key 22 that will provide the appropriate input for masked table 24. However, the value $m_{in}1 \hat{} m_{in}2$ is not directly stored, as split masks m1 and m2, as well as mkey, are the stored values that are used for different plaintext values.

Thus, for each encryption using the same key 22, only the steps involving the defined m1, m2 and mkey values are executed. Hence the encryption process using these values may be executed many times and DPA attacks on these encryption steps alone are not possible to directly determine key 22. Attacks by power measurement of r, $m_{in}1$ or $m_{in}2$ are not possible. Therefore the encryption process is secure. The fact that there is no requirement to recalculate the masked table nor to recalculate values used to arrive at m1, m2 and mkey values, means that the countermeasure is suitable for use in devices that are constrained in the power available for cryptographic processing. For example, the method of the preferred embodiment is useful in cryptographic functions carried out in wireless handheld devices. In this sense, the method of the preferred embodiment may be considered a low power countermeasure for differential power analysis attacks.

The preferred embodiment as described in FIG. 2 requires the definition of m1 and m2, once per key. For this reason, an attacker knowing the details of the algorithm and when it is executed may be able to launch a 3rd order DPA attack by measuring the power of $m_{in}1$, $m_{in}2$ and the input to masked table 24. (Alternatively a 4th order DPA could be launched by measuring the power of m1, m2, r and the input to masked table 24.).

As will be appreciated by those skilled in the art, in implementing the process the exclusive or (m1^m2) and the exclusive or (min1^min2) are not computed. If, despite what is described, these values are computed, a 2nd order DPA may be used to attack the cryptographic steps.

As may be seen from the above description, the masked master key (key 22 as masked with key mask 25) is stored and not unmasked. The further masking of the masked master key with additional masks forms the fixed final mask (used at the input of the tables). This fixed final mask is not directly loaded or stored or computed on its own. In the preferred embodiment, after masked tables and split masks are generated, $m_{in}1$ and $m_{in}2$ are destroyed (not stored or loaded again). The countermeasures described above are resistant to lower order DPA attacks and higher order DPA attacks are therefore required to enable an attacker to uncover the key values used.

Figure 3:
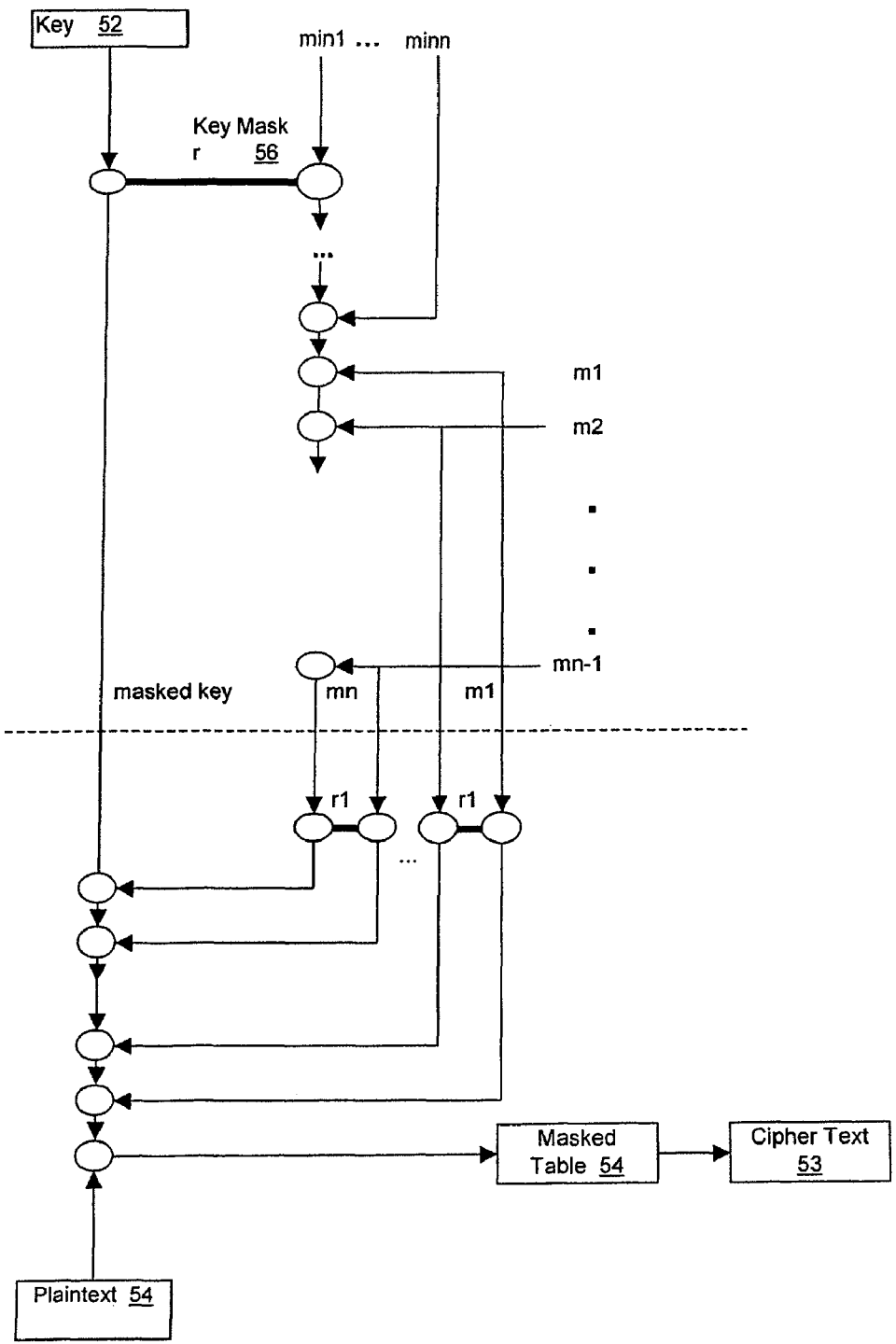
FIG. 3 is a block diagram showing an n-part split mask and its use in generating cipher text according to the preferred embodiment.

FIG. 3 is a block diagram showing a generalized example of the preferred embodiment. In FIG. 3, the example shows n split masks. Plaintext 50 is shown, to be combined with masked key 52. Masked table 54 is defined by input table masks $m_{in}1, \ldots m_{in}n$, in a manner analogous to that described for the two-part mask illustrated in FIG. 2. In the generalized case, table(i)=mtable(i^$m_{in}1$^ ... ^$m_{in}n$).

To obtain the set of split masks m1, . . . , mn, the random value for key mask 56, and random values m1, . . . mn−1 are randomly generated. The set of split masks m1, . . . , mn is generated as shown in FIG. 3. This step of generating the set of n split masks is analogous to the step of generating m1, m2 in the example of FIG. 2. The result of combining masking key 52 and key mask 56 using a bitwise exclusive or is the stored mkey value. Also stored are the split masks m1, . . . mn.

To generate input for masked table 54 for a given plaintext 50, a random value r1 is obtained. The value r1 is exclusive or'd with all stored m1, . . . , mn values, if n is even, or r1 is exclusive or'd with any (n−1) of m1, . . . mn if n is odd. The results are then successively exclusive or'd with the mkey value. Plaintext 50 is exclusive or'd with the final result to give the input for masked table 54.

The above approach permits a split mask to be used for a given key and to be stored and reused for different plaintexts encrypted with the same key. As will be appreciated by those skilled in the art, it is also possible to redefine the mask input values even while the same key is being used. The result is a higher-overhead process as the masked table (and the split mask values m1, . . . , mn) will be redefined for each new set of mask input values. Alternatively, the masked tables can be pre-computed and stored for each stored set of split masks.

The above approach permits a key mask, a split mask and masked tables to also be used for a new key. As will be appreciated by those skilled in the art, it is possible to permit the stored split mask and masked tables to be used for a new key by additionally storing the key mask r (key mask 56). A new key 52 is then immediately exclusive or'd with r (key mask 56). In the preferred embodiment, the input table masks $m_{in}1, \ldots m_{in}n$ are used only once to generate the masked tables and split masks, and then are destroyed (not stored). The stored split mask and masked tables are able to be used with the new key.

The preferred embodiment as described in FIG. 3 requires the definition of m1, . . . mn, once per key. For this reason, an attacker knowing the details of the algorithm and when it is executed may be able to launch a 3rd order DPA attack by measuring the power of $m_{in}1$, $m_{in}2$ and the input to masked table 24. Alternatively, a $(n+2)^{th}$ order DPA attack could be launched by measuring the power of each split mask, r and the input to masked table 24.

The split mask approach of the preferred embodiment is applicable to many key scheduling and (de)encryption algorithms, such as DES and AES. An example of the use of split masks as defined in the preferred embodiment being implemented in respect to key scheduling and encryption using AES (Advanced Encryption Standard) is described with reference to the block diagrams of FIGS. 4 and 5. In AES, in general round keys are generated from the exclusive or of other round keys. For this reason, the preferred embodiment as applied to AES permits new split masks to be created during the generation of round keys, as well as to be used during the encryption process. In this way, split masks may be used to make key generation and the ensuing encryption, using the resultant set of masked keys, more secure.

Figure 4:
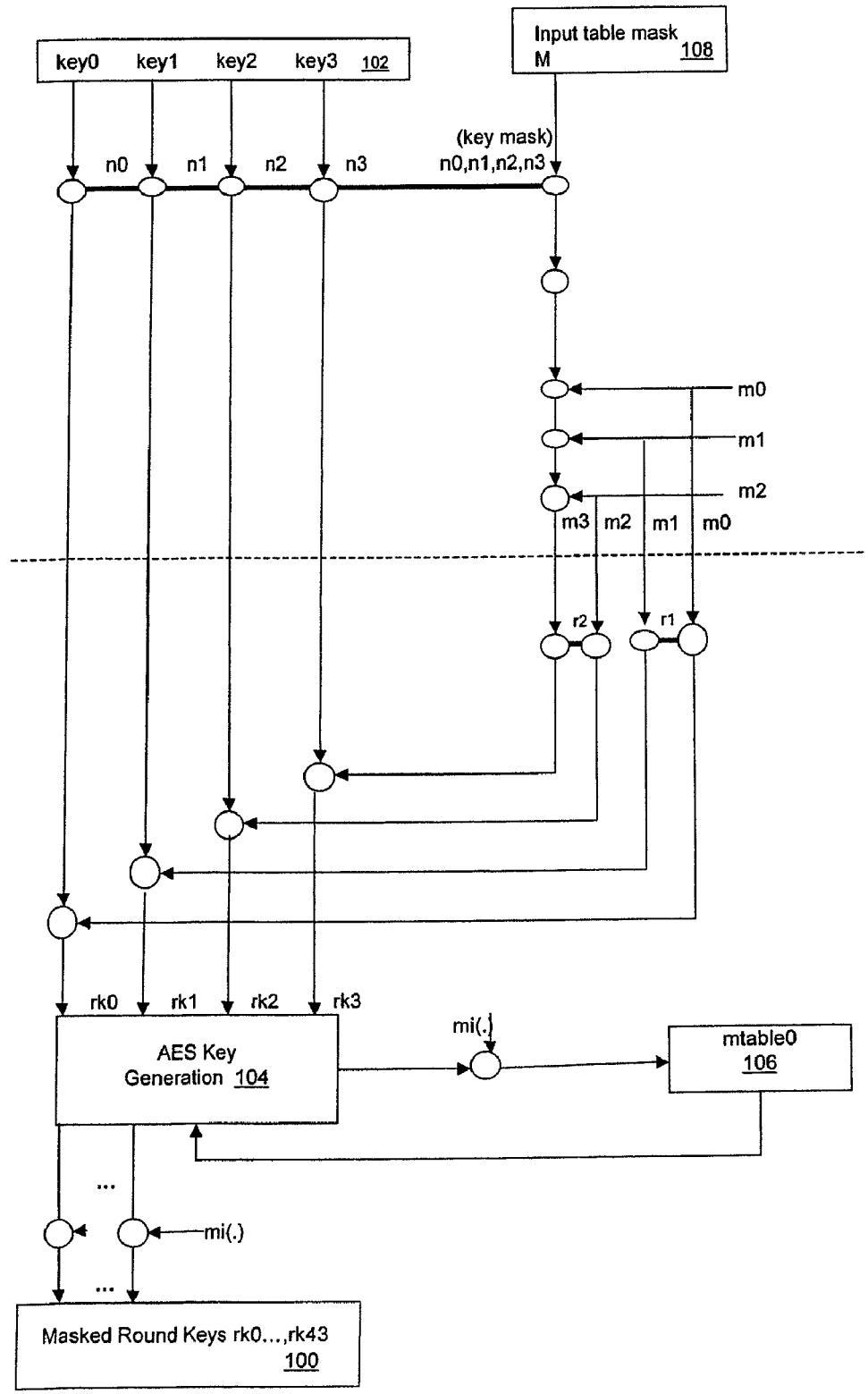
FIG. 4 is a block diagram showing the application of the approach of the preferred embodiment to an Advanced Encryption Standard ("AES") key generation.

In AES encryption there is a key generation process in which a set of 44 round keys is generated from an initial secret key value. The preferred embodiment provides for split masks to be used in the generation of this set of 44 masked round keys. This set (rk0, ..., rk43) is shown as masked round keys 100 in the block diagram of FIG. 4. Masked round keys 100 are generated from a 128-bit key, shown as key 102 in FIG. 4, which is represented by four 32-bit quantities, key0, key1, key2, key3. FIG. 4 shows a split mask process for key 102 to be masked to become a set of four 32-bit inputs to AES key generation 104. As specified by the AES approach, AES key generation makes use of a function that may be implemented as a table look-up, in the generation of the round keys. In AES key generation utilizing the preferred embodiment, the function is masked and is implemented using masked table 106. Masked table 106 (denoted mtable0) is defined with reference to a pre-defined table0 that implements the table look-up for AES key generation, as well as to a randomly generated input mask M. The definition is as follows:

$$mtable0(i) = table0(i \hat{\ } M).$$

With reference to FIG. 4, to generate masked round keys for AES encryption using the approach of the preferred embodiment, key 102 is obtained (either generated or received). As indicated above, key 102 comprises key0, key1, key2, key3, each of which is a 32-bit value. Once obtained, key 102 is masked using a key mask comprising four random 32-bit values n0, n1, n2, n3. In the preferred embodiment as applied to the AES key generation, key 102 as masked is stored (shown as mkey0, mkey1, mkey2, mkey3).

As is the case with the description of the generalized version of the preferred embodiment, the preferred embodiment as applied to AES includes the creation and storage of an initial mask set (split masks). In the example of FIG. 4, this is initial mask set is made up of values m0, m1, m2, m3. Values m0, m1, m2 are randomly generated. Value m3 is defined starting with the key mask and exclusive or'ing that value with the input mask M, and m0, m1, m2:

$$m3 = M \hat{\ } m0 \hat{\ } m1 \hat{\ } m2 \hat{\ } n0 \hat{\ } n1 \hat{\ } n2 \hat{\ } n3$$

In the preferred embodiment, after the split masks and masked tables are generated, M is destroyed (not loaded nor stored).

In the FIG. 4 example of the preferred embodiment as applied to the AES key generation, mask values m0, m1, m2, m3 are stored after they are obtained and generated. AES key generation 104 takes four inputs, shown as rk0, rk1, rk2, rk3 in FIG. 4. According to the preferred embodiment, these values are arrived at by randomizing the stored values m0, ..., m3 (m0, m1 using value r1, and m2, m3 using value r2) and then exclusive or'ing the randomized values with mkey0, ..., mkey3 respectively to give rk0, ..., rk3. The set rk0, ..., rk3 are then used as inputs for AES key generation 104.

As describe in general above, the generation of AES keys includes a table look-up. This is shown as a separate step in FIG. 4, with masked table 106 (mtable0) being shown apart from AES key generation 104. This representation allows for the illustration of the use of intermediate masks as contemplated in the preferred embodiment as applied to AES. The intermediate mask for each round key, for the example of FIG. 4, is given below in Table 1.

TABLE 1

| Round key (rk#) | Generated Mask of round key | Intermediate mask, mi( ) |
|---|---|---|
| 0, 16, 32 | $n_0 m_0$ | $n_1 n_2 n_3 m_1 m_2 m_3$ *[1] |
| 1, 17, 33 | $n_1 m_1$ | $n_0 n_2 n_3 m_0 m_2 m_3$ *[1] |
| 2, 18, 34 | $n_2 m_2$ | $n_0 n_1 n_3 m_0 m_1 m_3$ *[2] |
| 3, 19, 35 | $n_3 m_3$ | $n_0 n_1 n_2 m_0 m_1 m_2$ *[2] |
| 4, 20, 36 | $n_0 m_0$ | $n_1 n_2 n_3 m_1 m_2 m_3$ *[1] |
| 5, 21, 37 | $n_0 n_1 m_0 m_1$ | $n_2 n_3 m_2 m_3$ |
| 6, 22, 38 | $n_0 n_1 n_2 m_0 m_1 m_2$ | $n_3 m_3$ *[2] |
| 7, 23, 39 | $n_0 n_1 n_2 n_3 m_0 m_1 m_2 m_3$ | |
| 8, 24, 40 | $n_0 m_0$ | $n_1 n_2 n_3 m_1 m_2 m_3$ *[1] |
| 9, 25, 41 | $n_1 m_1$ | $n_0 n_2 n_3 m_0 m_2 m_3$ *[1] |
| 10, 26, 42 | $n_0 n_2 m_0 m_2$ | $n_1 n_3 m_1 m_3$ |
| 11, 27, 43 | $n_1 n_3 m_1 m_3$ | $n_0 n_2 m_0 m_2$ |
| 12, 28 | $n_0 m_0$ | $n_1 n_2 n_3 m_1 m_2 m_3$ *[1] |
| 13, 29 | $n_0 n_1 m_0 m_1$ | $n_2 n_3 m_2 m_3$ |
| 14, 30 | $n_1 n_2 m_1 m_2$ | $n_0 n_3 m_0 m_3$ |
| 15, 31 | $n_2 n_3 m_2 m_3$ | $n_0 n_1 m_0 m_1$ |
| | | *[1], *[2] updated with $\hat{\ } r1, \hat{\ } r2$ |

The second and third columns for Table 1 are calculated to provide correct generated masks of round keys and intermediate masks. In general, the mask of the round key is generated from the exclusive or of other masked round keys within AES algorithm. The intermediate mask is generated to be the equivalent of the additional masks that, when combined by an exclusive or with the generated mask for the round key, produces a resultant mask that is equal to the table input mask. In the example of FIG. 4, the table input mask is M and therefore the intermediate mask for each rk value is defined such that the combination of the mask applied to generate the rk value, and the intermediate mask will be the exclusive or product $n0 \hat{\ } n1 \hat{\ } n2 \hat{\ } n3 \hat{\ } m0 \hat{\ } m1 \hat{\ } m2 \hat{\ } m3$. By applying an intermediate mask defined in this way, the input to masked table 106 will be effectively masked by M, only. However, it should be noted that the table input mask is not limited to this value (M). It is also possible to define the table input mask to be a combination of other values used in the process (such as $m_{in}1, \ldots, m_{in}n$). The input table mask must be known (to allow it to be used in the encryption process) and be defined such that it is not readily ascertainable using low order DPA attacks.

In the preferred embodiment as illustrated in FIG. 4, the intermediate mask values are calculated and stored prior to the calculation of masked round keys 100. In the example of FIG. 4, there are only 17 intermediate masks to be stored. Table 1 also shows the additional masking of round keys required to obtain a fixed final mask for input table lookups within the key generation or scheduling algorithm (masked table 106) as well as for the tables in the encryption algorithm, as described in more detail below.

The key scheduling as described with reference to FIG. 4 may be carried only once for each new key 102 or it may be executed immediately before for each AES encryption. As is described above, for added security the initial set of masks (m0, m1, m2, m3) are randomized using r1, r2, that are generated for each encryption. In the example of the preferred embodiment shown in FIG. 4, some intermediate masks are subject to a further mask to remove the effect of this randomization before applying the value to masked table 106. This is shown by the intermediate masks denoted with either *[1] or *[2] in Table 1, for which a further mask equivalent to an exclusive or of r1 or r2 is to be carried out, respectively.

In the process shown by the block diagram of FIG. 4, key generation 104 takes the masked key to generate round keys as described in AES. As the round keys are generated, intermediate masks are loaded and used for any round keys that are defined by a look-up access of mtable0 (in the example of FIG. 4, round keys 3, 7, 11, 15, 19, 23, 27, 31, 35, 39).

The definition of round keys is carried out as specified in AES, but round keys are masked with different values to provide a countermeasure for power analysis security attacks. The definitions of rk0, . . . , rk3 are set out above. As part of AES key generation, rk3 is exclusive or'd with intermediate mask mi(3), mi(3)=n0^n1^n2^m0^m1^m2 (see Table 1). The round key rk4 is then defined as follows:

$$rk4 = rk0\verb|^|mtable0(rk3)\verb|^|c(0)$$

In this definition of rk4, the value for mtable0(rk3) is the masked table 106 value, calculated by masking the AES function table used in key generation and c(0) is a constant defined for AES.

Further round keys are then defined in accordance with AES:

$$rk5 = rk1\verb|^|rk4$$

$$rk6 = rk2\verb|^|rk5$$

$$rk7 = rk3\verb|^|rk6$$

$$rk8 = rk4\verb|^|mtable0(rk7)\verb|^|c(1),$$

$$rk9 = rk5\verb|^|rk8,$$

$$rk10 = rk6\verb|^|rk9,$$

$$rk11 = rk7\verb|^|rk10,$$

$$rk12 = rk8\verb|^|mtable0(rk11)\verb|^|c(2),$$

and so forth, as specified for AES key generation.

Finally, as is shown in FIG. 4, all round keys except those which were input to mtable0, are exclusive or'd with their intermediate masks according to Table 1. These masked round keys are then stored and available to be used in the encryption algorithm. Because of the manner of generating the masked round keys 100, as described above, they are each masked by the input table mask 108 (value M). The use of split (or multiple) masks in the masking that was carried out, makes the AES key generation in accordance with the preferred embodiment more secure from DPA attacks.

Figure 5:
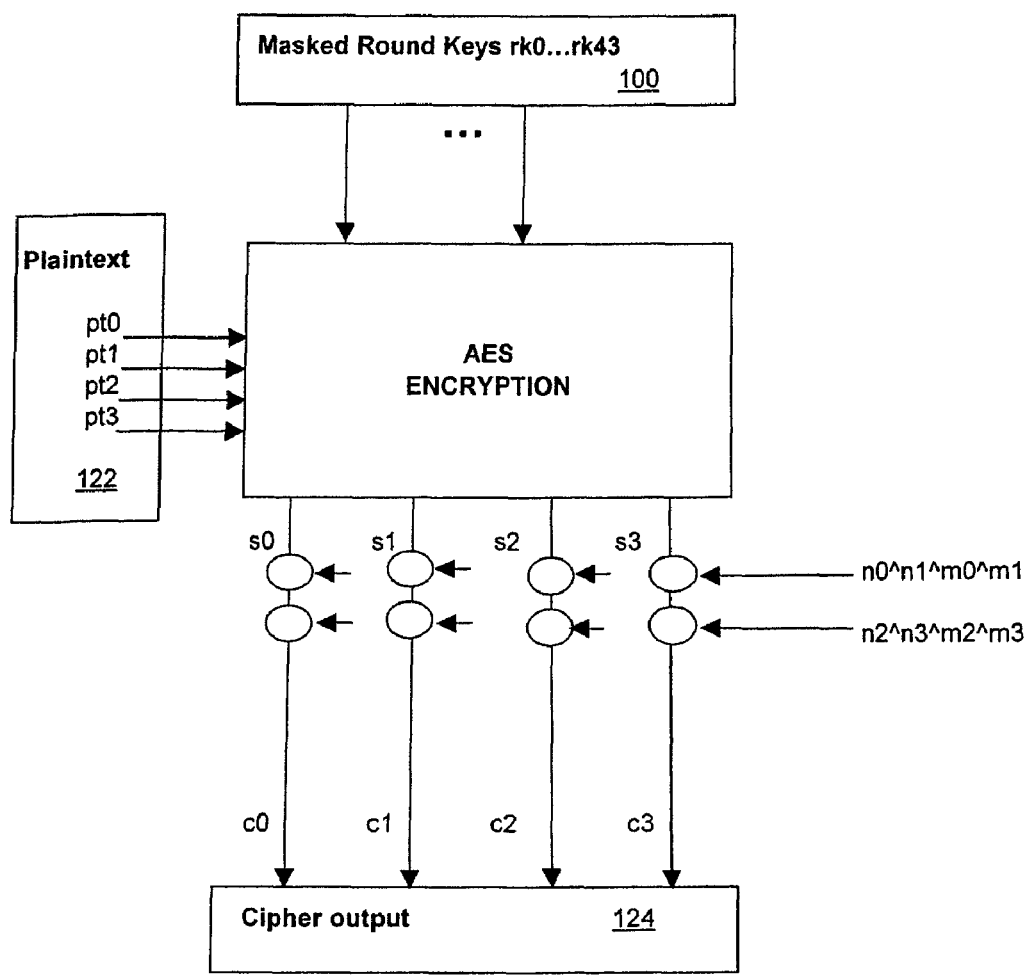
FIG. 5 is a block diagram showing the application of the approach of the preferred embodiment as applied to the process of AES encryption.

The preferred embodiment is applied also to the process of AES encryption after the masked round keys 100 are defined, as is shown in the block diagram of FIG. 5. As shown in FIG. 5, the AES encryption steps make use of the masked round keys 100 in conjunction with a set of defined masked tables 120, to encrypt plaintext data 122.

As part of the AES encryption, the set of masked tables 120 that are used with masked round keys 100 are defined to have an input mask with a value of m0^m1^m2^m3^n0^n1^n2^n3. However, as can be seen from this description, the input mask is never directly computed, stored or loaded.

As is shown in FIG. 5, plaintext 122 is exclusive or'd with masked round keys 100, in accordance with the AES process. The result is used as input for the appropriate table look-up in masked tables 120. The result of the AES encryption process carried out using masked round keys 100, plaintext 122 and masked tables 120 is a set of four values that are shown as S0, S1, S2, S3 in FIG. 5.

In the example of FIG. 5, the output values (S0, S1, S2, S3) are unmasked. To increase the security of the AES encryption, the output values are unmasked in a two-step process. Initially, the output values are each exclusive or'd with the value n0^n1^m0^m1. A second exclusive or is then carried out on the result, using the value n2^n3^m2^m3. As will be apparent to those skilled in the art, the combination of values for the multi-step unmasking of the result may be varied. The multi-step unmasking is carried out to avoid directly calculating the value n0^n1^n2^n3^m0^m1^m2^m3. Different ways to combine the values may be used in a multi-step unmasking process.

As may be seen from the above description, the approach of the preferred embodiment is able to be utilized in AES key generation and encryption. The split mask approach provides for increased security for key generation in the AES process and the encryption step, using the masked round keys, is itself made more secure. The unmasking step, carried out after the masked encryption tables have been accessed, is done using what is effectively a split mask, adding to the security of the encryption of the plaintext.

Various embodiments of the present invention having been thus described in detail by way of example, it will be apparent to those skilled in the art that variations and modifications may be made without departing from the invention. The invention includes all such variations and modifications as fall within the scope of the appended claims.

I claim:

1. A computing device-implemented method for carrying out encryption using a key value for encrypting a plaintext value to define a cipher text, the encryption being defined using an encryption function, the method comprising:
a processor executing the steps of:
a) defining a masked encryption function by masking the encryption function using an encryption function mask value;
b) defining a set of more than one split mask values, at least one, but not all, of the set of split mask values being defined with reference to the encryption function mask value and the remainder of the set of split mask values, such that when said set of split mask values are applied in masking steps, said at least one of the set of split mask values cancels with the remainder of the set of split mask values and said masking steps result in a masking as if said encryption function mask value was applied;
c) generating a final mask value by masking the key value using masking steps that comprise masking by applying the set of split mask values to said key value, such that said final mask value is equivalent to masking said key value with said encryption function mask value;
d) determining an input value by masking the plaintext value using masking steps that comprise masking by applying the final mask value; and
e) applying the input value to the encryption function to provide a cipher text output.

2. The method of claim 1 in which the step of generating the final mask value further comprises the step of masking the key value using a key mask value prior to masking with the set of split mask values, and wherein said at least one of the set of split mask values is further defined with reference to said key mask value, such that when said set of split mask values are applied in said masking steps, said masking steps further result in said masking as if said key mask value was further applied.

3. The method of claim 2 in which the step of defining said at least one of the set of split mask values with reference to the remainder of the set of split mask values comprises the steps of masking said at least one of the set of split mask values with the remainder of the set of split mask values.

4. The method of claim of claim 2 in which the step of defining a set of split mask values m1 . . . mn comprises the steps of:

a) defining the encryption function mask value to comprise a set of random values min1 to minn;
b) defining the remainder of the set of split mask values to be the random values m1 to mn−1; and
c) defining said at least one of the set of split mask values as a masking value mn to be (key mask value)^min1^ . . . ^minn^m1^ . . . ^mn−1.

5. The method of claim 2 further comprising the step of storing the masked key and the set of split mask values.

6. The method of claim 2 further comprising the steps of applying a random mask to an even number of the set of split mask values prior to the step of masking the key value with the set of split mask values.

7. The method of claim 1 in which the encryption function is a table look-up.

8. The method of claim 1 in which masking is a bitwise exclusive or operation carried out on binary values.

9. A computing device-implemented method for use in a cryptographic process, the cryptographic process using a key value to define input to a cryptographic function, the method comprising the steps of:
  a) masking the cryptographic function using a function mask value;
  b) defining a set of more than one split mask values, at least one, but not all, of the set of split mask values being defined with reference to the function mask value and the remainder of the set of split mask values, such that when said set of split mask values are applied in masking steps, said at least one of the set of split mask values cancels with the remainder of the set of split mask values and said masking steps result in a masking as if said function mask value was applied;
  c) masking the key value using steps that comprise masking by applying the set of split mask values to said key value to obtain a masked input key value, such that said masked input key value is equivalent to masking said key value with said function mask value; and
  d) using the masked input key value to define the input to the masked cryptographic function.

10. The method of claim 9, further comprising the step of randomizing the remainder of the set of split mask values.

11. A computing device program product for carrying out encryption using a key value for encrypting a plaintext value to define a cipher text, the encryption being defined using an encryption function, the computing device program product comprising a computer usable medium having computer readable program code means embodied in said medium, and comprising
  program code means for defining a masked encryption function by masking the encryption function using an encryption function mask value;
  program code means for defining a set of more than one split mask values, at least one, but not all, of the set of split mask values being defined with reference to the encryption function mask value and the remainder of the set of split mask values, such that when said set of split mask values are applied in masking steps, said at least one of the set of split mask values cancels with the remainder of the set of split mask values and said masking steps result in a masking as if said function mask value was applied;
  program code means for generating a final mask value by masking the key value using masking steps that comprise masking by applying the set of split mask values to said key value, such that said final mask value is equivalent to masking said key value with said encryption function mask value;
  program code means for determining an input value by masking the plaintext value using masking steps that comprise masking by applying the final mask value; and
  program code means for applying the input value to the encryption function to provide a cipher text output.

12. The computing device program product of claim 11 in which
  the program code means for generating the final mask value further comprises program code means for masking the key value using a key mask value prior to masking with the set of split mask values, and wherein said program code means for defining said set of more than one split mask values is further operative to define said at least one of the set of split mask values with reference to said key mask value, such that when said set of split mask values are applied in said masking steps, said masking steps further result in said masking as if said key mask value was further applied.

13. The computing device program product of claim 12 in which the program code means for defining said at least one of the set of split mask values with reference to the encryption function mask value further comprises program code means for masking said at least one of the set of split mask values with the remainder of the set of split mask values.

14. The computing device program product of claim 12 in which the program code means for defining a set of split mask values m1 . . . mn comprises program code means for:
  a) defining the encryption function mask value to comprise a set of random values min1 to minn,
  b) defining the remainder of the set of split mask values to be the random values m1 to mn−1; and
  defining said at least one of the set of split mask values as a masking value mn to be (key mask value)^min1^ . . . ^minn^m1^ . . . ^mn−1.

15. The computing device program product of claim 12 further comprising program code means for storing the masked key and the set of split mask values.

16. The computing device program product of claim 12 further comprising program code means for applying a random mask to an even number of the set of split mask values prior to masking the key value with the set of split mask values.

17. The computing device program product of claim 11 in which the encryption function is a table look-up.

18. The computing device program product of claim 11 in which masking is a bitwise exclusive or operation carried out on binary values.

19. A computing device program product for use in a cryptographic process, the cryptographic process using a key value to define input to a cryptographic function, the computing device program product comprising a computer usable medium having computer readable program code means embodied in said medium, and comprising:
  program code means for masking the cryptographic function using a function mask value;
  program code means for defining a set of more than one split mask values, at least one, but not all, of the set of split mask values being defined with reference to the function mask value and the remainder of the set of split mask values, such that when said set of split mask values are applied in masking steps, said at least one of the set of split mask values cancels with the remainder of the set of split mask values and said masking steps result in a masking as if said function mask value was applied;
  program code means for masking the key value using steps that comprise masking by applying the set of split mask values to said key value to obtain a masked input key value, such that said masked input key value is equivalent to masking said key value with said function mask value;

program code means for using the masked input key value to define the input to the masked cryptographic function.

20. The computing device program product of claim 19, further comprising program code means for randomizing the remainder of the set of split mask values.

21. A system for carrying out encryption using a key value for encrypting a plaintext value to define a cipher text, the encryption being defined using an encryption function, the system comprising:

means for masking the encryption function using an encryption function mask value to define a masked encryption function;

means for defining a set of more than one split mask values, at least one, but not all, of the set of split mask values being defined with reference to the encryption function mask value and the remainder of the set of split mask values, such that when said set of more than one split mask values are applied in masking steps, said at least one of the set of split mask values cancels with the remainder of the set of split mask values and said masking steps result in a masking as if said encryption function mask value was applied;

means for masking the key value by applying the set of split mask values to the key value to generate a final mask value, such that said final mask value is equivalent to masking said key value with said encryption function mask value;

means for masking the plaintext value with the final mask value to determine an input value; and means for applying the input value to the encryption function to provide a cipher text output.

22. The system of claim 21 in which the means for masking the key value further comprises means for using a key mask value prior to masking with the set of split mask values, and which system further comprises means for further defining said at least one of the set of split mask values with reference to said key mask value, such that when said set of split mask values are applied in said masking steps, said masking steps further result in said masking as if said key mask value was further applied.

23. The system of claim 22 in which the means for defining said at least one of the set of more than one split mask values with reference to the remainder of the set of split mask values comprises the steps of masking said at least one of the set of split mask values with the remainder of the set of split mask values in which the step of defining said at least one of the set of split mask values with reference to the remainder of the set of split mask values comprises the steps of masking said at least one of the set of split mask values with the remainder of the set of split mask values.

24. The system of claim 22 in which the means for defining a set of more than one split mask values m1 ... mn comprises means for a) defining the encryption function mask value to comprise a set of random values min1 to minn;
b) defining the remainder of the set of split mask values to be the random values m1 to mn−1; and
c) defining said at least one of the set of split mask values as a masking value mn to be (key mask value)^min1^ . . . ^minn^m1^ . . . ^mn−1.

25. The system of claim 22 further comprising means for storing the masked key and the set of split mask values.

26. The system of claim 22 further comprising means for applying a random mask to an even number of the set of split mask values prior to masking the key value with the set of split mask values.

27. The system of claim 21 in which the encryption function is a table look-up.

28. The system of claim 21 in which masking is a bitwise exclusive or operation carried out on binary values.

29. A system for use in a cryptographic process, the cryptographic process using a key value to define input to a cryptographic function, the system comprising means for masking the cryptographic function using a function mask value;

means for defining a set of more than one split mask values, at least one, but not all, of the set of split mask values being defined with reference to the function mask value, such that when said set of split mask values are applied in masking steps, said at least one of the set of split mask values cancels with the remainder of the set of split mask values and said masking steps result in a masking as if said function mask value was applied;

means for masking the key value by applying the set of split mask values to the key value to obtain a masked input key value, such that said masked input key value is equivalent to masking said key value with said function mask value; and means for using the masked input key value to define the input to the masked cryptographic function.

30. The system of claim 29, further comprising means for randomizing the remainder of the set of split mask values.

* * * * *